United States Patent [19]

Ocker et al.

[11] Patent Number: 4,583,966

[45] Date of Patent: Apr. 22, 1986

[54] METHOD OF FILLING CALENDER/EMBOSSER ROLLS USING VIBRATIONS

[75] Inventors: Jerold R. Ocker, Roscoe, Ill.; Jere W. Crouse, Beloit, Wis.

[73] Assignee: Beloit Corporation, Beloit, Wis.

[21] Appl. No.: 434,065

[22] Filed: Oct. 13, 1982

[51] Int. Cl.⁴ ............................................ B21B 13/00
[52] U.S. Cl. ............................. 493/374; 72/710; 29/130; 29/148.4 D
[58] Field of Search ............ 29/130, 125, 126.5, 29/148.4 D, DIG. 4 C; 72/710, 430; 493/374

[56] References Cited

U.S. PATENT DOCUMENTS 3,814,054  6/1974  Tajihi .................................... 29/130

FOREIGN PATENT DOCUMENTS 698713  12/1979  U.S.S.R. ............................... 72/710

Primary Examiner—Leon Gilden
Attorney, Agent, or Firm—Hill, Van Santen, Steadman & Simpson

[57] ABSTRACT

A method and mechanism for assembling paper machine filled rolls including a lower support with a cylinder and a piston for receiving a roll mandrel, vertically extending bolts for supporting a plate to press on relatively soft disks slid over the mandrel end, a variable speed vibration generator connected to the upper end of the mandrel with a vibration speed control so that the mandrel can be vibrated through natural frequencies and harmonics thereof with a device to monitor mandrel vibration frequency and displacement so that the disks on the mandrel compact more effectively and the friction between the disks and mandrel is reduced.

2 Claims, 7 Drawing Figures

U.S. Patent Apr. 22, 1986 4,583,966
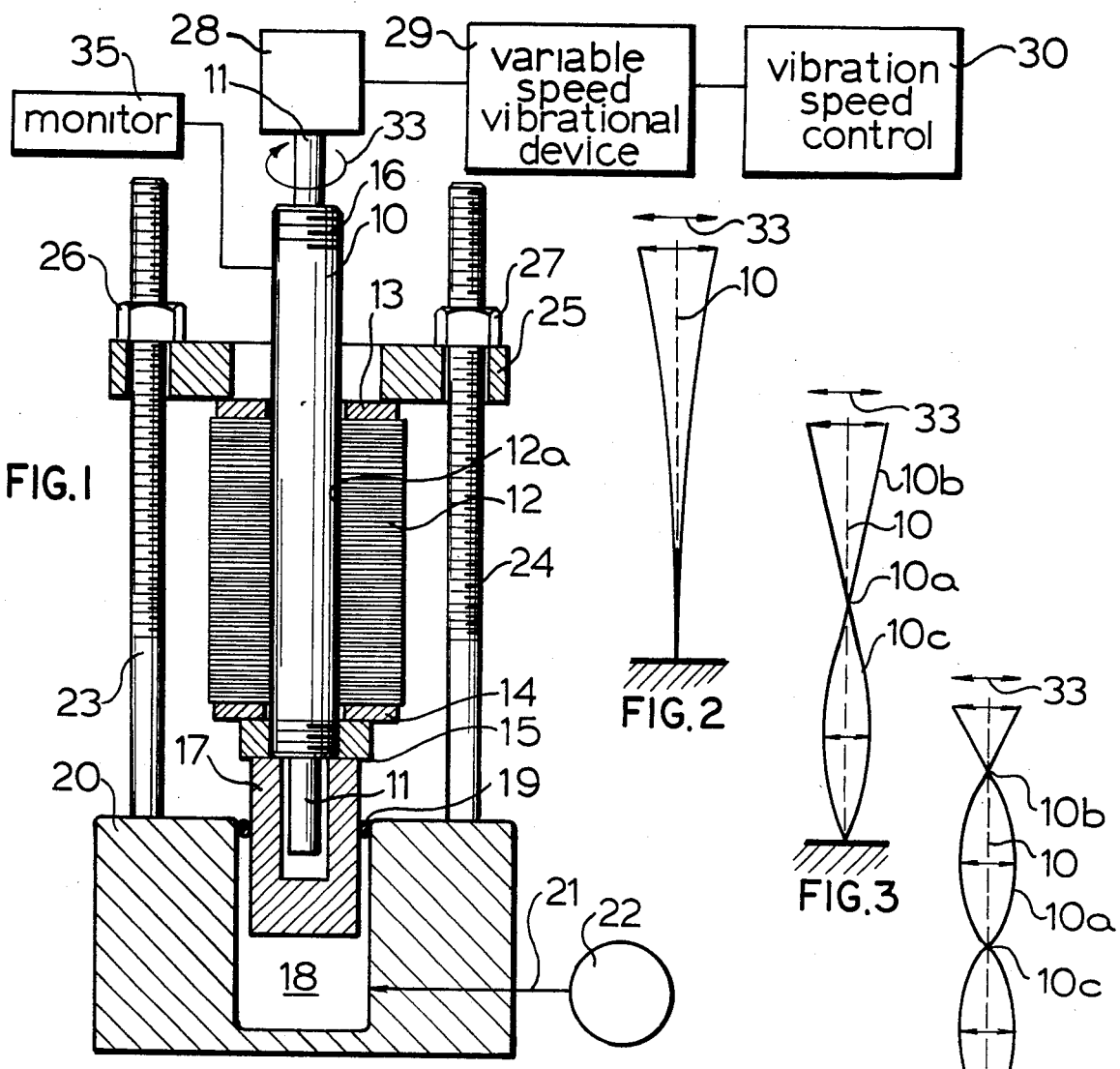
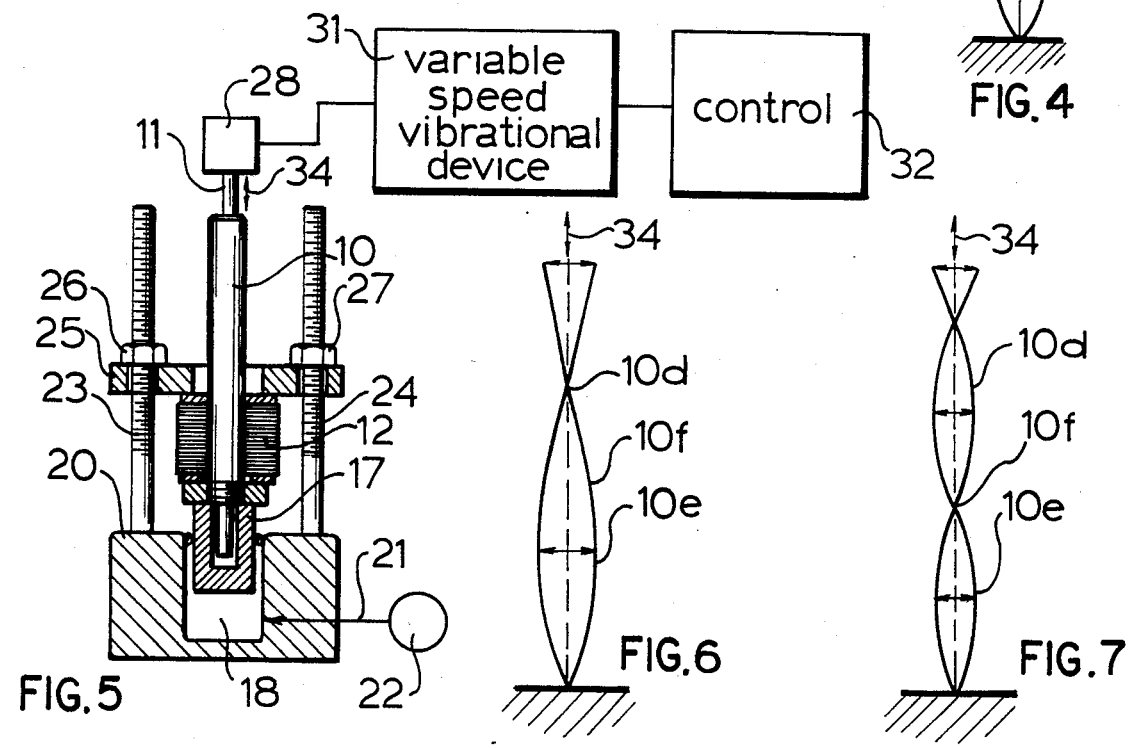

METHOD OF FILLING CALENDER/EMBOSSER ROLLS USING VIBRATIONS

BACKGROUND OF THE INVENTION

The invention relates to improvements in mechanism and method for assembling paper machine filled rolls, and particularly calender and embossing rolls of the type having a central mandrel with stacked fiber disks along the mandrel axis compressed thereon to provide a roll having a surface formed from the layers of disks on the mandrel.

Mandrels of these types are generally used in special finishing machines and frequently used on coated papers to produce special effects. One of these is a friction calender which consists of a mandrel having disks of paper or cotton filled material to form the roll and this filled roll is used in combination with one two highly polished chilled iron rolls which can be heated or cooled. The coated paper is passed between the rolls with the coated side next to the iron roll. The iron is revolved at a peripheral speed which exceeds that of the filled roll by 1½ to 4 times and produces a polishing action on the coating.

The manufacture of filled rolls for this type of use or other calendering or embossing use involves sequentially sliding many disks of a relatively soft filled material over a roll mandrel while it is located vertically in a hydraulic press. The disks of filled material are in sheet form and are usually made of cotton fibers or cotton and wool fiber blends. A precise hole is die-cut or lathe bored in the center of the fill sheets so that there is an interference fit of 0.010" to 0.030" on the roll mandrel. A number of disks are placed on the shaft or mandrel and pressed under extreme high pressure to compact the material. This process is repeated a number of times until a complete shaft is filled through a given face length. Large rolls may require two weeks or more to complete the filling because the compression and compaction of the layers along the roll requires time for the axial force to take effect. For example, after a specified increment of fill material is placed on the roll mandrel, the material is subjected to pressure up to 12,000 psi for approximately 48 hours. This pressure and time serve to compact the fill material fibers together in a solid hard mass. Because the hydraulic press conventionally applies pressure from the bottom end of the roll mandrel, the bottom layer of fill material is subjected to the full pressure of the press. Each succeeding layer up from the bottom is subjected to a pressure which is reduced by an amount of frictional force between the fill material and roll mandrel for the layers below. Thus, the top layer is subjected to a pressure which is reduced by the total frictional force of all of the fill material below. This difference in pressure may cause a nonuniformity in the final compaction or density of the fill material. Also, if there are some layers of fill material which fit especially tight or have high friction with the roll mandrel, the material can hang-up while pressing and cause hard or soft rings in the finished roll.

When the compression assembly of the disks on the mandrel is completed, it is removed and milled or machined to a cylindrical smooth finished outer surface. When the completed assembled filled roll is used, the outer surface density or hardness is determined by the compaction of the disks placed on the mandrel and if nonuniform compaction has occurred, the hardness of the roll surface will be nonuniform, and thus the action of the roll on the paper web being processed through a calender will be nonuniform across the width of the sheet.

It is accordingly an object of the present invention to obtain a method and mechanism for assembling filled rolls which can achieve uniform density of compaction of the filler disks along the entire length of the roll mandrel.

A further object of the invention is to provide an improved method and mechanism of assembling a filled roll which reduces the time of manufacture and particularly reduces the compaction time required for each group of disks placed on the mandrel.

A still further object of the invention is to provide an improved method and mechanism for assembling filled rolls wherein better and more uniform control is attained over the degree of compaction between the disks and wherein problems during assembly such as hang-up of the disk with an especially tight fit are elimated.

A feature of the invention is to provide a hydraulic compaction device arranged with a vibration generator attached to the mandrel wherein the frequency, and/or amplitude of the vibration force applied to the mandrel can be varied to vibrate the partially filled and completely filled mandrel at its fundamental natural frequency or at any harmonic thereof while pressure is on the fill material. The vibration of the mandrel is monitored as to frequency and displacement to determine when a natural frequency or harmonic has been reached by adjusting the speed of the vibrational device. Change in harmonics is made during assembly so that nodal points which have little or no vibration can be changed in location along the length of the mandrel to avoid nonuniform compaction at or between the nodal points with the exciting frequency varied from harmonic to harmonic several times during the pressing period.

Other objects, advantages and feature, as well as equivalent structures and methods which are intended to be covered herein, will become apparent with the teaching of the principles of the invention in connection with the disclosure of the preferred embodiments thereof in the specification, claims, and drawings, in which:

DRAWINGS

FIG. 1 is a vertical sectional view, shown in somewhat schematic form of a structure for assembling paper machine filled rolls operated in accordance with the methods and principles of the present invention;

FIGS. 2 through 4 illustrate the vibrational amplitude of the mandrel at varying frequencies of drive;

FIG. 5 is a vertical sectional view shown somewhat schematically, similar to FIG. 1 illustrating a step in the loading of the mandrel and illustrating a slight variation in the form of application of vibrational forces; and FIGS. 6 and 7 illustrate the vibrational amplitude of effect on the mandrel.

DESCRIPTION OF THE PREFERRED EMBODIMENTS

As illustrated in FIG. 1, a filled roll is assembled and includes a mandrel or shaft 10 with a plurality of disks 12 of fill material such as of cotton fibers or cotton and wool fiber blends slid over the mandrel. A precise hole 12a is diecut or lathe bored in the center of the fill sheet so that there is an interference fit with the outer surface of the mandrel 10 of 0.010" to 0.030" on the roll mandrel, and the disks are forced down over the mandrel individually until a group is gathered, and then the group is axially pressed.

At the lower end of the mandrel is a metal plate 14 holding one end of the disks held in place by a nut 15 threaded onto the threaded end of the mandrel. The other end 16 is similarly threaded to receive a nut to clamp a plate 13 in place at the other end when the roll is completely pressed and the nut on the threaded end 16 will hold the compression in the disks. The disks are roughcut of material, and when completed will be milled in a lathe or similar equipment to provide a smooth cylindrical outer surface on the filled roll.

The mandrel has shaft ends 11 projecting from the end, and at the lower end is supported on a piston 17 with a recess to accommodate the lower shaft end 11. The piston is slidably mounted in a cylinder 18 in a support base 21. A hydraulic fluid line 21 supplied by pressurized fluid such as from a pump 22 directs hydraulic liquid into the cylinder 18 beneath the piston to apply the axial compressing pressure after the disks have been inserted over the mandrel and after an upper second support for the upper or second end of the mandrel is put in place.

The base has vertical threaded rods 23 and 24 extending upwardly and an upper support plate 25 is placed over the end plate 13 and nuts 26 and 27 are threaded onto the rods. The rods hold the upper support plate 25 while the force applying means in the form of the piston 17 applies an axial compressive force to the stacked disks 12 on the mandrel 10.

Mounted on the upper end of the shaft 11 is a vibration generator 29 secured to the shaft by a connection 28. The vibration generator 29 has a vibration speed control 30 so as to control the vibration induced in the mandrel 10. As indicated by the arrowed line 33, preferably vibration is induced in an oscillatory or a circulatory motion. However, it is also possible to generate a lateral vibratory oscillation at right angles to the mandrel 10 or parallel to the mandrel 10 as indicated by the arrowed line 34 in FIG. 5.

FIG. 5 illustrates the structure of FIG. 1 at the beginning of assemblage of the roll showing a first group of disks 12 placed on the mandrel 10 with the upper end support plate 25 mounted in place, and the nuts 26 and 27 tightened. Hydraulic liquid will then be supplied to the cylinder 18 at a predetermined pressure to compress the disks 12 to the desired compression. In the arrangement of FIG. 5, an end mounting 28 for the shaft 11 is provided with the variable speed vibrational device 31 capable of providing an axial vibration and operated by a variable speed control 32.

As each group or increment of disks are placed over the mandrel 10, and the end support plate 25 put in position with the nuts 26 and 27 tightened, and axial pressure applied by the piston 17, the mandrel is vibrated at its fundamental natural frequency or any harmonic thereof. While the pressure is on the fill material, this will reduce or eliminate the frictional force between the mandrel 10 and the fill disks 12. This will also facilitate the compaction and densification of the fill material fibers making it possible to reach the desired densification in a shorter period of time. After one group of disks are compacted and vibrated, another group is placed on until the mandrel is filled to complete the roll.

The vibration is either in a plane perpendicular to the roll mandrel axis, preferably in a circular or orbitable motion, or in a longitudinal straightline along the roll mandrel axis. This vibration may be continuous or intermittent while the roll filling is under pressure in the press.

Vibration at harmonics other than a fundamental natural frequency will create nodal points on the roll mandrel, and at these nodal points, there will be little or no vibration. This is illustrated by the amplitude curves shown in FIGS. 2, 3 and 4. For measuring the amplitude and frequency, a monitor 35 is attached to the mandrel in such a manner that it may be moved to determine the amplitude at different locations. At the vibrational frequency indicated by FIG. 2, the lower end of the mandrel will be subject to little or no vibration so that a change in vibrational frequency will generate the amplitude curve indicated by FIG. 3. At that frequency at a center location 10a, little or no vibration will occur so that after a period of time, the vibration speed control 30 is set to change the frequency to obtain a frequency indicated at FIG. 4 where location 10a is subjected to maximum amplitude and locations 10b and 10 receive little or no amplitude, and these locations received full amplitude at the frequency shown in FIG. 3.

A similar result is obtained in the arrangement of FIG. 5 which illustrates a vibration in an axial plane by the arrowed line 34. At the frequency shown in FIG. 6, point 10d receives no amplitude whereas points 10e and 10f receive a greater amplitude. By changing the frequency, the amplitude is obtained shown in FIG. 7 so that point d is vibrated with an adequate amplitude, and point 10f is at the node where little amplitude is received. The vibrational speed control can be adjusted to be changed in steps or gradually varied back and forth so that the mandrel 10 receives essentially uniform overall vibration and the effect between the mandrel 10 and the disks 12 is uniform along the length of the roll.

In operation an operator sets a mandrel 10 vertically in the lower support 20 in the recess of the piston 17 and begins stacking disks 12 onto the mandrel in the manner illustrated in FIG. 5. A second or upper support plate 25 is placed over the upper end and nuts 26 and 27 are threaded downwardly against the plate, and an axial force applying means in the form of a piston 17 is applied to axially compress the stacked disks on the mandrel. A vibration generator 29 induces a harmonic vibration in the mandrel 10 as the compressive force is applied by the force applying means so that frictional forces between the mandrel and disks are reduced during compression.

Thus, it will be seen that we have provided an improved mechanism for assembling paper machine rolls which meets the objectives and advantages above set forth, and provides an arrangement which will attain an improved product, and avoid disadvantages of the existent procedures.

We claim as our invention:

1. A mechanism for assembling paper machine rolls comprising in combination:

a base support for a lower end of a roll mandrel including a piston with a recess for receiving the mandrel and a cylinder in the base with means for delivering a hydraulic fluid under pressure into the cylinder to apply an axial force to the piston and mandrel supported therein;

vertically extending threaded members projecting upwardly from the base;

a mandrel compressing upper plate mounted on said bolts and removable therefrom for stacking disks on the mandrel and for supporting the upper end of the disks as an axial force is applied at the lower end;

a monitor for attaching to the upper end of the mandrel to detect mandrel vibrational amplitude;

a variable speed vibration generator for connection to the upper end of the mandrel; and a vibration speed control connected to the generator for varying the vibrational speed of the generator through harmonic frequencies of the shaft with the application of additional disks thereto.

2. A mechanism for assembling paper machine filled rolls comprising in combination:

a support for a first end of a roll mandrel;

a second support for the second end of the mandrel;

force applying means connected to urge said supports toward each other to apply an axially compressive force to stacked annular disks on the mandrel, said disks having inner diameters causing them to fit tightly against said mandrel;

a vibration generator connected for inducing vibrations in the mandrel as a compressive force is applied to the force applying means of sufficient amplitude and frequency so that frictional forces between the mandrel and disk are reduced during compression and the disk compressed more effectively, and a monitoring device for measuring the frequency and displacement at a predetermined axial location on the mandrel to determine when the natural frequency or a harmonic has been reached. R

* * * * *